(12) United States Patent
Petrova

(10) Patent No.: US 7,178,305 B2
(45) Date of Patent: Feb. 20, 2007

(54) HANGER BRACKET

(75) Inventor: George I. Petrova, Lutz, FL (US)

(73) Assignee: Robbins Engineering, Inc., Tampa, FL (US)

( * ) Notice: Subject to any disclaimer, the term of this patent is extended or adjusted under 35 U.S.C. 154(b) by 279 days.

(21) Appl. No.: 10/956,948

(22) Filed: Oct. 1, 2004

(65) Prior Publication Data

US 2006/0080934 A1    Apr. 20, 2006

(51) Int. Cl.
   *E04B 7/04* (2006.01)
   *E04B 1/38* (2006.01)
   *E04C 5/00* (2006.01)

(52) U.S. Cl. .............. 52/715; 52/92.1; 52/714

(58) Field of Classification Search ........... 52/712, 52/714, 715, 702, 92.1, 92.2, 745.09, 317; 248/200, 247, 248, 300
   See application file for complete search history.

(56) References Cited

U.S. PATENT DOCUMENTS

| | | | | |
|---|---|---|---|---|
| 5,186,571 A | * | 2/1993 | Hentzschel | 403/231 |
| 5,528,875 A | * | 6/1996 | Ziegler et al. | 52/702 |
| 5,678,797 A | * | 10/1997 | Gogan | 248/251 |
| 5,797,694 A | * | 8/1998 | Breivik | 403/231 |
| 6,189,277 B1 | * | 2/2001 | Boscamp | 52/317 |
| 6,290,214 B1 | * | 9/2001 | DeSouza | 256/69 |
| 6,739,562 B2 | * | 5/2004 | Rice | 248/247 |
| 6,781,827 B2 | * | 8/2004 | Goodman et al. | 361/685 |

* cited by examiner

*Primary Examiner*—Naoko Slack
*Assistant Examiner*—Hunter M Dreidame
(74) *Attorney, Agent, or Firm*—Senniger Powers

(57) ABSTRACT

A bracket is provided comprising a rectangular and substantially planar base panel, a pair of generally opposed and substantially parallel panels extending generally normal to the base panel and spaced apart, with a third panel extending generally normal to the base panel along a third edge, with a fourth panel extending generally normal to the base panel along a fourth edge thereof, with that fourth panel extending in a direction generally opposite the direction of the first, second and third panels, whereby the first, second and third panels form a channel along the base panel and having one closed end. A method of use of this bracket is also disclosed.

17 Claims, 5 Drawing Sheets

US 7,178,305 B2

HANGER BRACKET

BACKGROUND OF THE INVENTION

This invention relates to construction brackets, and more particularly to a bracket for supporting a horizontal board or beam, such as the type that may serve as a fire block between vertical studs in the wall of the structure, and a method for installing that bracket.

A fire block is well known in the construction industry as a board or beam set between two studs to inhibit the spread of fire by limiting the oxygen available to the fire and by reducing the "chimney effect" of the space between vertical studs. Traditionally, the installation of a fire block includes delivery of appropriately-sized boards or beams, conventionally 2×4 boards, to the construction area and then cutting the boards or beams to the appropriate length and sizing them to the exact distance between each pair of studs, and finally nailing the boards or beams in place. This is a time-consuming and often wasteful process in that adjacent studs may either be bowed or for other reasons not spaced identically from the adjacent stud. This means that each fire block board must be cut on-site to the correct length to achieve a close fit. If the board is inadvertently cut too short, it cannot be used because it would not provide the desired blockage to prevent spread of a fire. Without a tight fit the fire could spread through the wall in a chimney-like fashion. Moreover, having to nail each fire block onto the studs takes a significant amount of time and energy.

SUMMARY OF THE INVENTION

To overcome these disadvantages it is desirable to have a structure that not only provides for a quick and relatively unskilled installation of the fire blocks, but also compensates for minor variations in the spacing between adjacent studs, so that slightly undersized fire block boards can be used effectively.

To achieve the foregoing, as well as other advantages that will become apparent to those skilled in the art, this invention provides a bracket having a generally rectangular and substantially planar base panel, which base panel has opposed and generally parallel first and second edges and opposed and generally parallel third and fourth edges, along with a pair of generally opposed and substantially parallel panels extending generally normal to the base panel along the respective first and second edges, and a third panel extending generally normal to the base panel along the third edge, with a fourth panel extending generally normal to the base panel along that fourth edge and extending in a direction generally opposite the direction of the first, second and third panels, whereby the first, second and third panels form a channel along the base panel and having one closed end.

BRIEF DESCRIPTION OF THE DRAWINGS

One preferred embodiment of the bracket of this apparatus will be described in detail below in connection with the drawings, in which.

DESCRIPTION OF PREFERRED EMBODIMENTS

Figure 1:
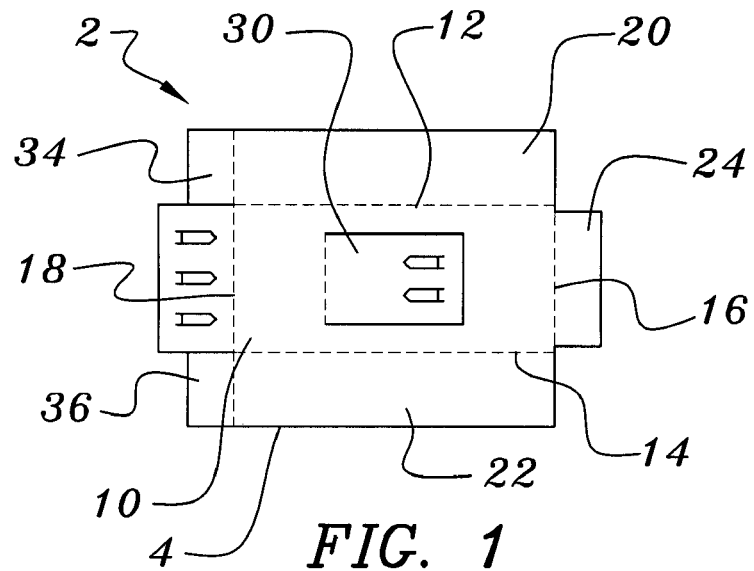
FIG. 1 is a planar view of a blank of sheet material used to fabricate the bracket of this embodiment.

A preferred embodiment of the bracket 2 of this invention is illustrated in the drawings FIGS. 1–9. This bracket is suitably formed of a piece of stiff sheet material, suitably sheet steel, and preferably is formed by stamping and folding various components. FIG. 1 is a planar view of a blank 4 of stiff sheet material from which the bracket of this invention is stamped. In this illustration the cut lines are shown as solid lines and the fold lines are shown as dashed lines, with the combination of cut lines and fold lines defining a plurality of panels.

Figure 2:
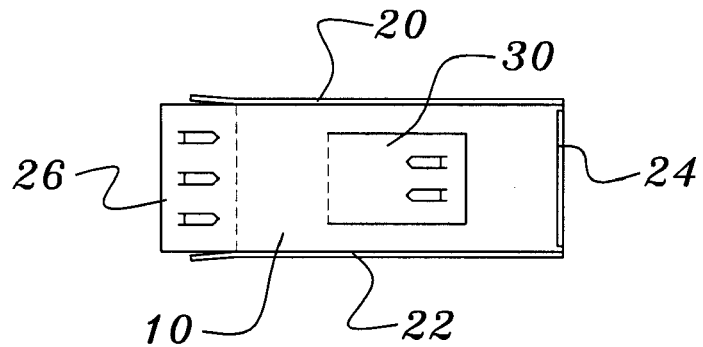
FIG. 2 is a planar view of the blank of FIG. 1, showing it partially formed with the side panels folded up and a central panel deflected in an angular manner.
Figure 3:
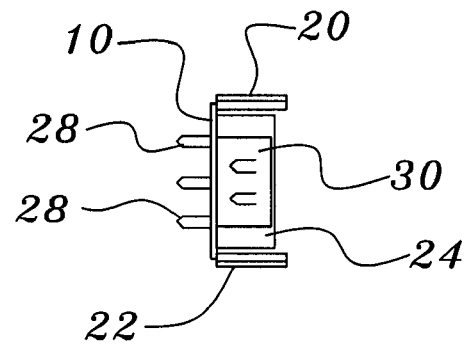
FIG. 3 is an end elevation of the partially-formed bracket of FIG. 2.
Figure 4:
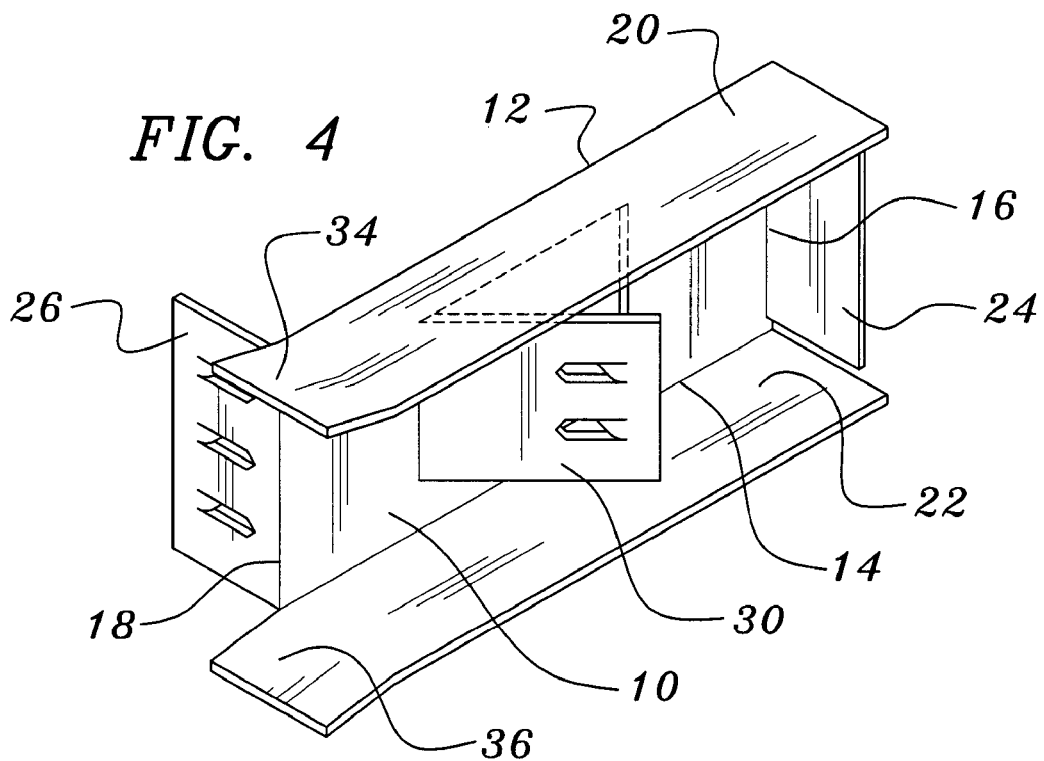
FIGS. 4 and 5 are perspective views of the fully formed bracket of FIG. 2.
Figure 5:
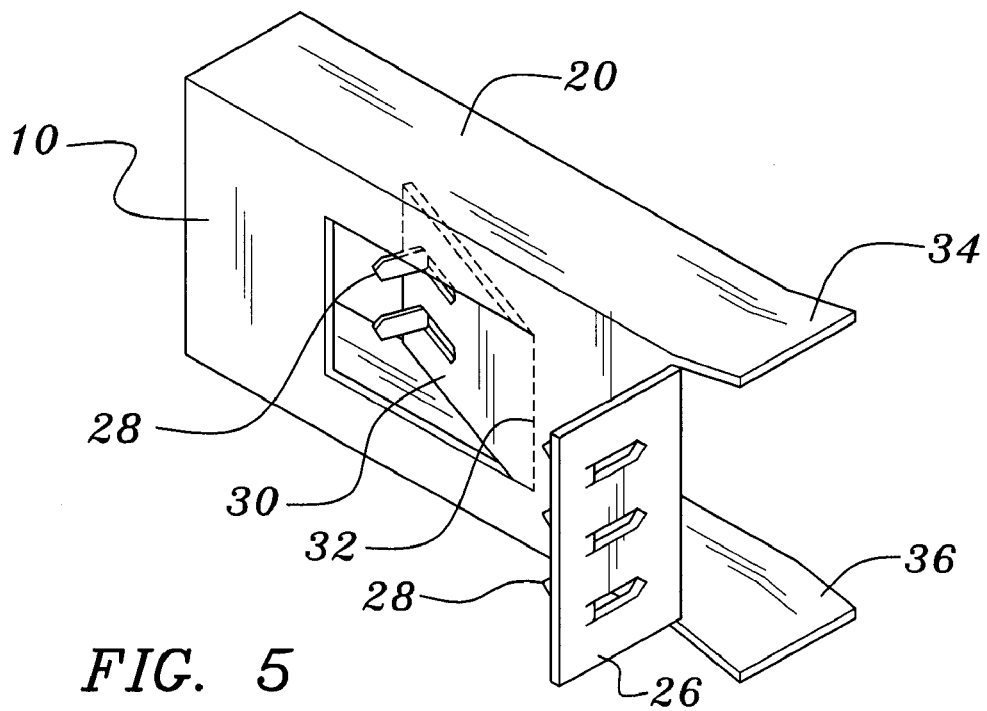

In FIG. 1, the bracket comprises a generally rectangular and substantially planar base panel 10 having opposed and generally parallel first and second edges 12 and 14, and opposed and generally parallel third and fourth edges 16 and 18. As shown in FIG. 2 and subsequent figures, folding the edge portions along fold lines 12 and 14 forms a pair of generally opposed and substantially parallel panels 20 and 22 extending generally normal to the base panel 10 along the respective first and second edges 12 and 14. By folding along the line 16 is formed a third panel 24 extending generally normal to the base panel 10 along that third edge 16. A fourth panel is formed by bending the blank along fold line 18, in a direction generally opposite those of panels 20, 22 and 24. Thus is created a fourth panel 26 extending generally normal to the base panel 10 along that fourth edge 18. This fourth panel 26 extends in the direction generally opposite the direction of the first, second and third panels 20, 22 and 24, whereby the first, second and third panels 20, 22 and 24 form a channel along the base panel 10 and having one end closed by that third panel 24.

Figure 6:
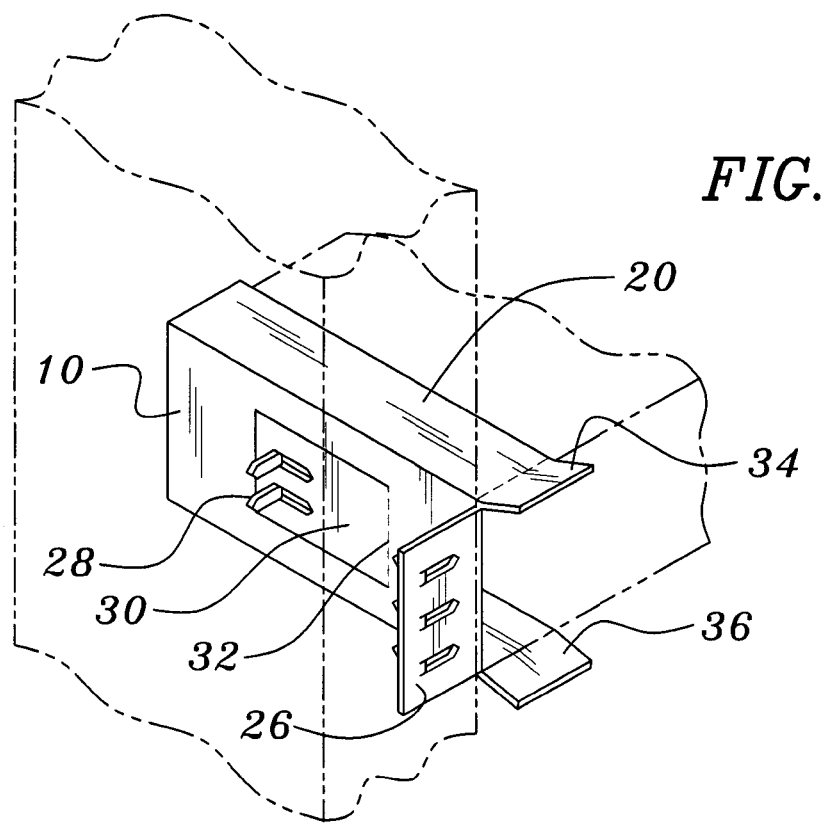
FIGS. 6 and 7 are perspective views of the brackets of FIGS. 2, 4 and 5 mounted on a vertical stud (shown in phantom) with a horizontal member (shown in phantom) inserted therewithin.

The fourth panel 26 is preferably provided with at least one supporting tooth, and preferably with a plurality of supporting teeth 28 formed integrally with the fourth panel and extending outwardly there from, as best seen in FIG. 6.

In the bracket of this embodiment, the base panel 10 further includes a portion 30 of that base panel bent along fold line 32 to extend angularly outwardly from the planar portion 10 at an acute angle therewith. This angularly extending portion further includes at least one, and preferably a plurality of tooth portions 28 extending generally normal to that angularly outwardly extending portion 30 in a direction toward the planar portion of the base panel 10.

On the bracket 2 of this embodiment at least one, and preferably both, of said first and second substantially parallel panels 20 and 22 further comprise a tab portion or portions 34 and 36 extending past the fourth edge 18 of the base panel 10. Thus, as shown most clearly on FIG. 4, this formed and folded bracket defines a slot or pocket formed by the planar base member 10, the two side panels 20 and 22 and the rear end panel 24. The angled portion 30 of the planar base portion extends into the slot formed by those side panels for purposes to be described in connection with the use of the bracket.

Figure 8:
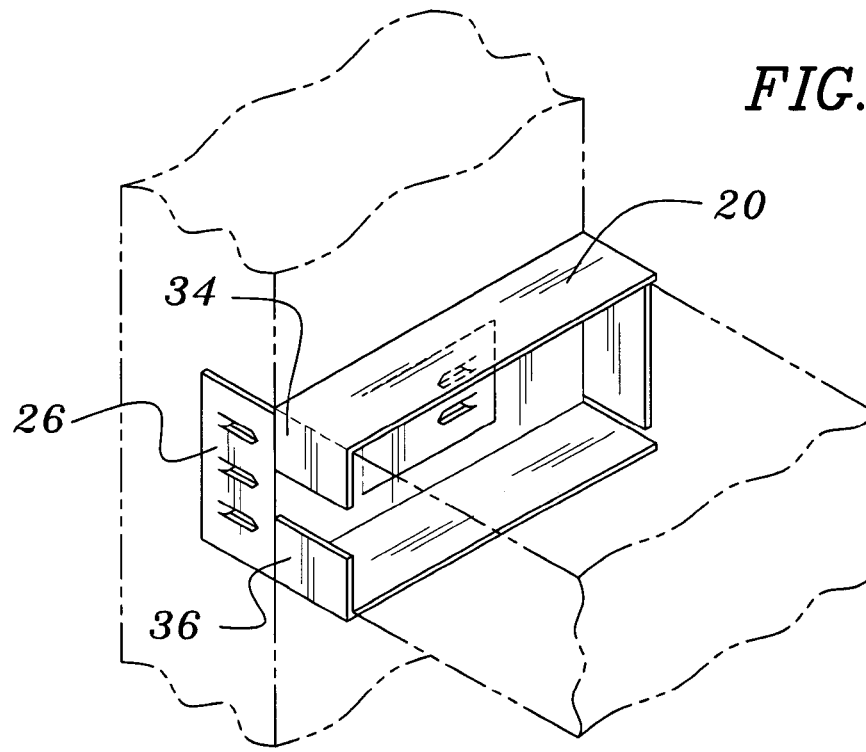
FIG. 8 is a perspective view of the bracket of FIG. 7, with the front retaining tabs folded down to entrap the cross member shown in phantom.
Figure 7:
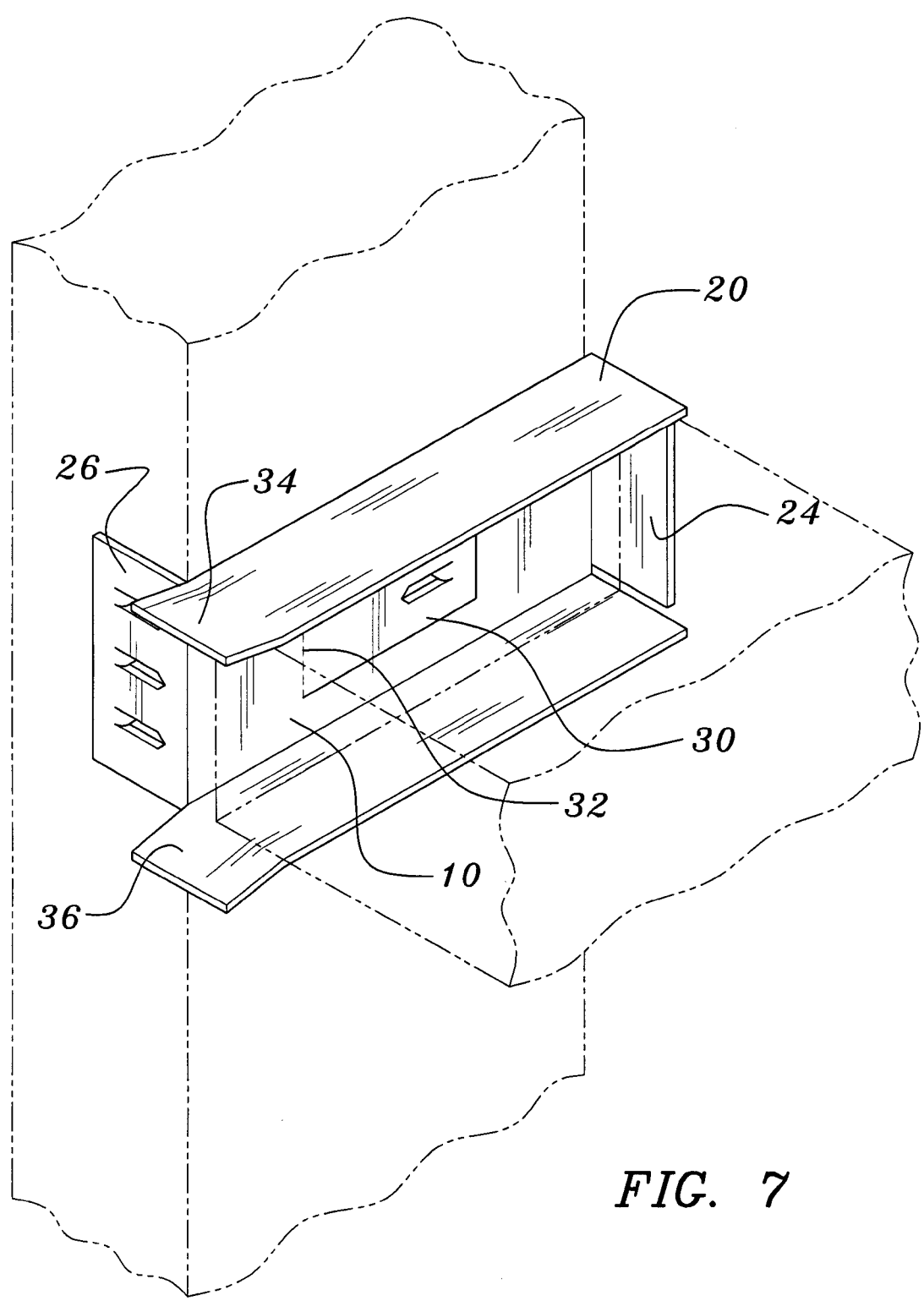
Figure 9:
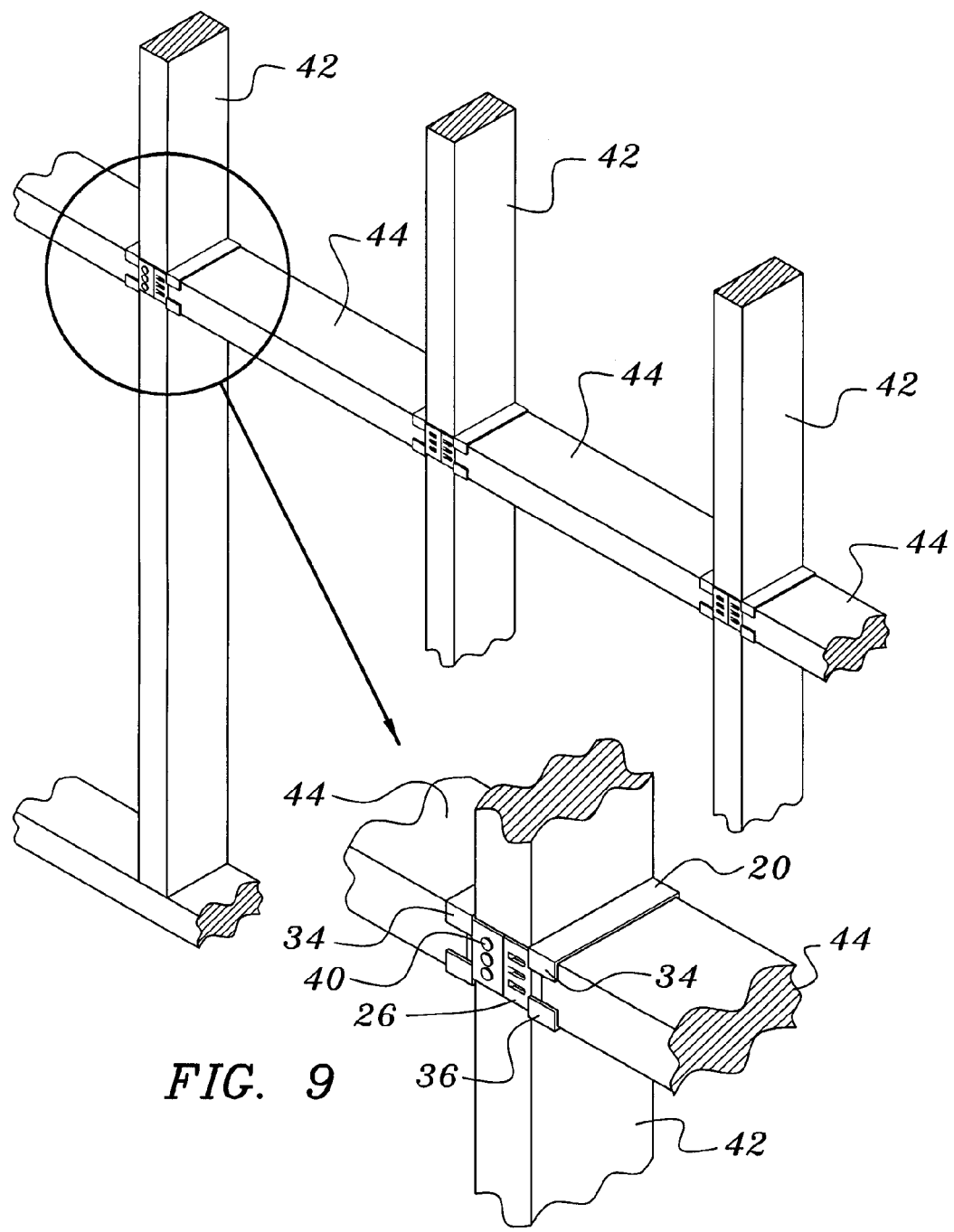
FIG. 9 is a perspective view, partially in section, illustrating a plurality of the brackets of this invention installed in the walls of a building to support horizontal cross members between adjacent vertical studs.

As shown in FIGS. 6–9, this bracket, in a preferred method of use, is attached to a vertical stud 42. For the bracket described in connection with FIGS. 1–5, the affixation may be accomplished by hammering the prongs 28 formed in panel 26 into the stud 42. In an alternative embodiment in which apertures are formed in panel 26 without the teeth, FIG. 9 illustrates the affixation by insertion of at least one fastener 40, such as a nail or screw, through at least one of those apertures, so that such fastener 40 holds the bracket securely to the stud or other support structure. As shown in FIG. 9, pairs of these brackets are suitably affixed, securing a first bracket 2 to one of two generally parallel, spaced apart supporting structures, such as studs 42, and then securing a second such bracket 2 to the second of such support structures 42, such that the second bracket 2 is positioned substantially opposite the first bracket 2, with the parallel panels on each bracket extending toward the other such bracket. Then, a board 44 of a length generally equal to but not greater than the distance between the first and second brackets 2 is inserted into the channel of each such bracket. As should be apparent, the step of urging the board, as with a hammer, into those channels serves to force the tooth portions 28 of the angled portion 30 of each bracket into engagement with the support structure 42. This conveniently serves both to wedge the transverse board 44 in position and to further engage the support structure with more teeth 28 of the bracket, providing for an even firmer engagement by the bracket with the support. In this manner, the first and second ends of the transverse board rests within the channels formed in the respective brackets. By the use of these brackets 2 to support the transverse board 44, even if the transverse board 44 is slightly shorter than the distance between adjacent studs, the metal channel formed by these brackets supports the transverse board 44 and fills in any gap that might otherwise occur between the end of the transverse board 44 and the stud 42.

Once the transverse member 44 has been fully inserted into the channel defined by the bracket, it may be fully secured therein by bending the tabs 34 and 36 over the outer end of that transverse member, as illustrated in FIGS. 8 and 9. Where the bracket of this embodiment is formed of sheet metal, these tabs may easily be bent by tapping with a hammer.

While the foregoing describes one particularly preferred embodiment of the bracket of this invention and its method of use, it is to be understood that this description is illustrative only of the principles of the invention and is not to be considered limitative thereof, as numerous variations and modifications of the structure, all within the scope of the invention, will readily occur to those skilled in the art. Accordingly, the scope of this invention is to be limited solely by the claims appended hereto.

What is claimed is:

1. A bracket comprising:
   a generally rectangular and substantially planar base panel, having opposed and generally parallel first and second edges and opposed and generally parallel third and fourth edges;
   a pair of generally opposed and substantially parallel panels extending generally normal to said base panel along said respective first and second edges;
   a third panel extending generally normal to said base panel along said third edge; and
   a fourth panel extending generally normal to said base panel along said fourth edge, said fourth panel extending in a direction generally opposite the direction of said first, second and third panels, whereby the first, second and third panels form a channel along the base panel and having one closed end.

2. The bracket of claim 1 wherein said fourth panel includes a plurality of apertures for use in attaching said bracket to a support structure.

3. A method for using the bracket of claim 2, comprising the steps of inserting at least one fastener through at least one of said plurality of apertures whereby said fastener holds the bracket securely to the support structure.

4. The bracket of claim 1 wherein said fourth panel includes at least one supporting tooth formed integrally with said fourth panel and extending outwardly therefrom.

5. A method for using the bracket of claim 4 comprising the step of urging said at least one supporting tooth into said support structure whereby said at least one supporting tooth holds the bracket securely to the support structure.

6. The bracket of claim 1 wherein said fourth panel includes a plurality of supporting teeth formed integrally with said fourth panel and extending outwardly therefrom.

7. A method for using the bracket of claim 6 comprising the step of urging said supporting teeth into said support structure whereby said supporting teeth hold the bracket securely to the support structure.

8. The bracket of claim 1 wherein said base panel further comprises a portion of said base panel extending angularly outwardly from said planar portion at an acute angle therewith, said angularly extending portion further including at least one tooth portion extending generally normal to said angularly outwardly extending portion in a direction toward said planar portion of said base panel.

9. A method of using the bracket of claim 8, comprising the steps of:
   securing a first bracket to one of two generally parallel, spaced-apart supporting structures;
   securing a second bracket to the second of said support structures, such that said second bracket is positioned substantially opposite said first bracket, with said parallel panels of each said bracket extending toward the other said bracket;
   inserting into each said channel, a board of a length generally equal to but not greater than the distance between said two supporting structures, such that said insertion of said board engages said base panel angularly extending portion and urges said angularly extending portion toward the plane of the remainder of said base panel, whereby the tooth portion of the angularly extending portion is forced into engagement with said support structure.

10. The bracket of claim 1 wherein at least one of said first and second substantially parallel panels further comprise a tab portion extending past said fourth edge of said base panel.

11. The bracket of claim 1 wherein both of said first and second substantially parallel panels further comprise tab portions extending past said fourth edge of said base panel.

12. The bracket of claim 1 formed from a single piece of sheet metal.

13. A method for using the bracket of claim 2, comprising the steps of inserting a plurality of fasteners through said plurality of apertures whereby said fasteners hold the bracket securely to the support structure.

14. A method of using the bracket of claim 1, comprising the steps of:
   securing a first said bracket to one of two generally parallel, spaced-apart supporting structures;
   securing a second said bracket to the second of said support structures, such that said second bracket is positioned substantially opposite said first bracket, with said parallel panels of each said bracket extending toward the other said bracket;
   inserting into each said channel, a board of a length generally equal to but not greater than the distance between said supporting structures.

15. The method of claim 14 wherein said board has a first and a second end, whereby the length of said board is such that said first and second ends rest within the channels brackets.

16. The method of claim 14 wherein said support structure is a stud.

17. The method of claim 14 wherein said securing step is performed by inserting fastening means through said plurality of apertures.

* * * * *